June 17, 1924.
N. T. ALBRIGHT
GLASS BORING DEVICE
Filed Jan. 30, 1923
1,497,887
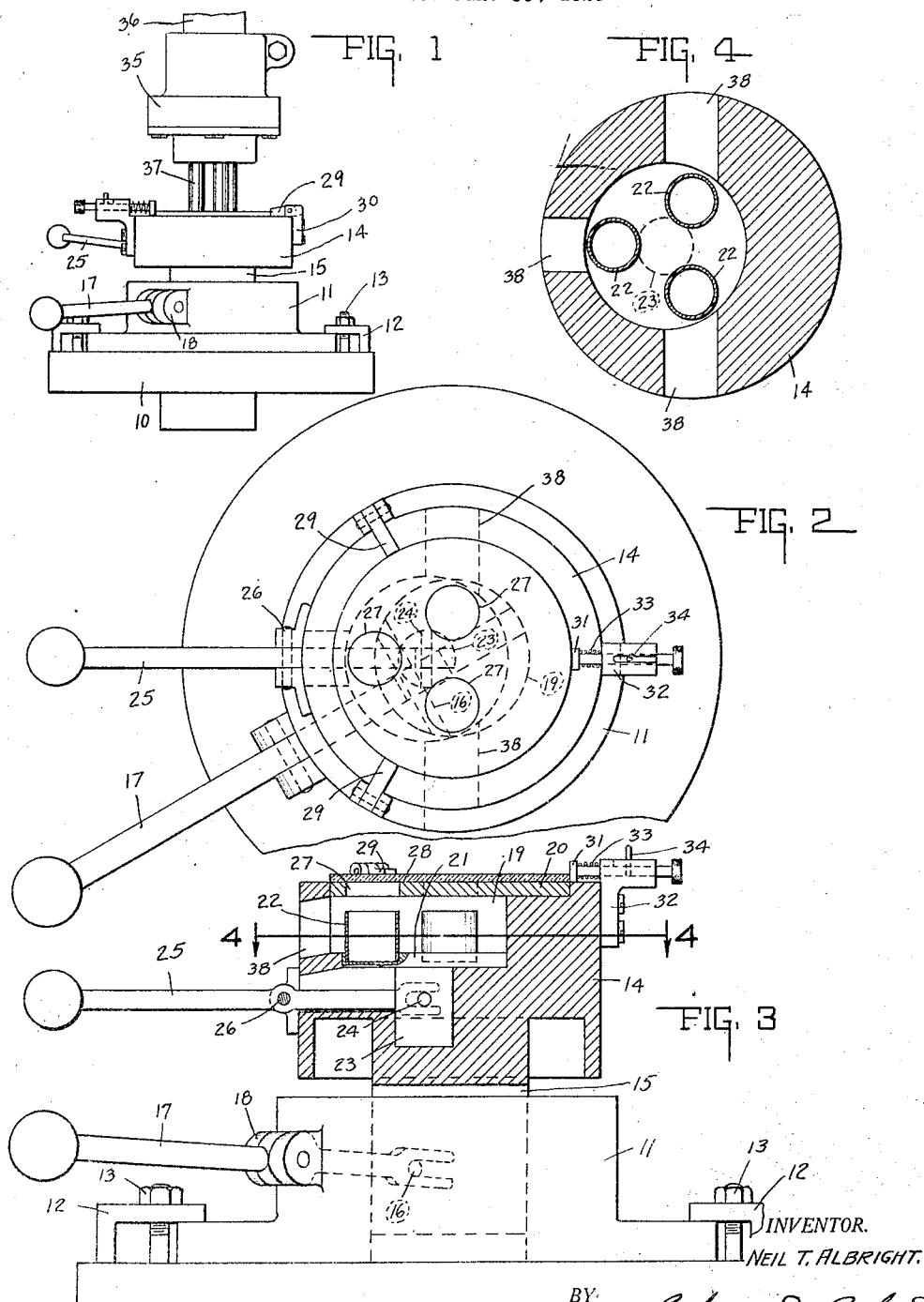
INVENTOR.
NEIL T. ALBRIGHT.
BY
ATTORNEYS.

Patented June 17, 1924.

1,497,887

UNITED STATES PATENT OFFICE.

NEIL T. ALBRIGHT, OF KOKOMO, INDIANA.

GLASS-BORING DEVICE.

Application filed January 30, 1923. Serial No. 615,780.

*To all whom it may concern:*

Be it known that I, NEIL T. ALBRIGHT, a citizen of the United States, and a resident of Kokomo, county of Howard, and State of Indiana, have invented a certain new and useful Glass-Boring Device; and I do hereby declare that the following is a full, clear, and exact description thereof, reference being had to the accompanying drawings, in which like numerals refer to like parts.

This invention relates to a drill block for use on a drill press wherein it is desired to drill a single or plurality of holes simultaneously through a piece of glass.

Heretofore it has been difficult to drill a plurality of holes simultaneously through a piece of glass, and particularly through thin glass without chipping the edges. In making glass covers for instrument dials and the like in which there is desired to have a plurality of holes through which the instruments extend, said holes must be drilled in such fashion as to prevent chipping and thereby necessitating the grinding process in addition to the drilling. For the prevention of chipping, it is necessary to drill the glass on one side and then reverse the same, drilling it on the other side in the identical spot through which the hole was started. In reversing the glass for this operation, it has been quite difficult to properly align the same so that the opposite drilling will coincide, particularly where there are a plurality of holes.

The principal feature of this invention is to provide a block having mechanisms thereon for aligning the glass, whereby the drilling may be started on one side of the glass and then the glass may be reversed and properly positioned and set and held in such position so that the drilling of the opposite sides will coincide to a very fine exactness. Furthermore, the block and positioning or centering mechanism thereon is so arranged that the ordinary workman may quickly center the glass without difficulty or loss of time.

The full nature of the invention will be understood from the accompanying drawings and the following description and claims.

In the drawings, Fig. 1 is a side elevation of the drill block showing the drill head in drilling position thereon. Fig. 2 is an enlarged plan view of the drill head with a glass mounted thereon. Fig. 3 shows the base of the block in elevation with the movable portion in central vertical cross section. Fig. 4 is a section taken on the line 4—4 of Fig. 3 through the movable portion of the block.

In the drawings there is shown a drill press table 10 upon which there is clamped the base 11 of the drill block, said base being secured fixedly in position by the clamping straps 12 and bolts 13. Removably mounted in the base 11, there is a movable block 14 which is provided with a central vertical post 15 extending downwardly therefrom so as to slide vertically within the base 11. Said post is provided with a pin 16 which is engaged by the bifurcated end of the operating lever 17, said lever being pivoted between the ears 18 on the base 11. By manually moving the lever 17 up or down, the block 14 may be lowered out of operative engagement with the drills or raised into engagement therewith.

The block 14 is provided with an eccentric or offset opening 19 which is covered by the work plate 20. Movably mounted in said opening, there is a plunger 21 carrying three upwardly extending tubular members 22 having an outside diameter exactly equal to the diameter of the holes to be ground and positioned on the plunger in exact alignment with the position of the holes. It may be observed that the tubes 22 are of the same diameter as the drills and in direct alignment therewith. A downwardly extending guide portion 23 of the plunger 21 is provided with a pin 24 adapted to be engaged by the bifurcated end of the lever 25 which is pivoted to the block 14 at 26, so that by pushing the lever 25 downwardly, the tubes 22 are elevated so as to pass through the apertures 27 provided in the plate 20.

The glass plate 28 to be drilled is placed on the work plate 20 and is centered thereon by the locating dogs 29 pivoted to the blocks 30 secured about the periphery of the block 14, said dogs being adapted to rest upon the plate 20 when in lowered position. Opposite the dogs 29, there is a locating plunger 31 mounted in the supporting bracket 32 secured upon the block 14 through which it is radially slidable with respect to the glass 28. Between the head of the plunger and the bracket 32, there is a yielding spring 33, and the pin 34 is provided for locking the plunger and holding it against said spring when drawn back to non-engaging position.

Mounted above the block 14, there is a multiple drill head 35 mounted on the end of the drill press spindle 36 in which there are secured the drills 37. The drills 37 are of the same diameter as the holes to be ground and the tubes 22.

In operation, the block 14 is lowered into the base 11 by releasing the lever 17, and likewise the plunger 21 and tubes 22 carried thereby are lowered by releasing the handle 25. The glass plate 28 is then placed in position and centered by turning the dogs 29 down in engagement with the edges thereof and releasing the plunger 31. The drills 37 are then rotated and the lever 17 pushed downwardly so as to elevate the block 14 until the glass comes in contact with the rotating drills. The usual grinding material is placed on the glass, enabling the drills to properly grind the same to a very slight depth of possibly $\frac{1}{32}$ of an inch, thus cutting through the outer surface thereof. The block 14 is then lowered by releasing the handle 17, and the plunger 31 is pulled back and locked in non-engaging position by the pin 34. The dogs 29 are elevated out of the way and the glass plate 28 is turned over so as to expose the opposite side to the drills. The lever 25 is then pushed down so that the tubes 22 engage in the annular recesses cut by the drill so that the plate is accurately positioned for further drilling. The plate is thus held in position by the tubes 22 while the block 14 is forced upwardly until the glass plate again engages the rotating drills 37. By reason of the proper positioning of the glass plate by the tubes 22, which are in perfect alignment with the drills 37, and upon the grinding solution being again poured on to the glass, the drills 37 will grind the glass immediately over the previously ground portion. As the drills continue the grinding to such an extent that their grinding edges are embedded in the glass, the lever 25 may be released and the tubes 22 lowered out of the way, thus permitting the drilling to continue until they reach the previously ground portion on the opposite side. The glass plate 28 will thereby have the desired apertures drilled through it in such fashion as to prevent chipping of the edges and by reason of the above described means, the oppositely drilled surfaces will meet exactly so that there will be a smoothly ground inner wall about the apertures. This arrangement will prevent danger of the oppositely ground portions not meeting and thereby leaving a rough edge or shoulder at their junction. The grinding mixture which is in a more or less liquid state will drop into the opening 19 through the apertures cut in the glass, and from there it will flow out of the block through the openings 38.

The invention claimed is:

1. A device for drilling an aperture in a plate of glass comprising a drill block for supporting the glass while being partially drilled on one side thereof, a head movably mounted therein provided with a tubular non-drilling engaging member of the same diameter and in alignment with the aperture to be drilled, and manually operated means for moving said tubular member in and out of engagement with the partially drilled portion when the glass is reversed for positioning the same while the other side is being drilled, the positioning of said glass being such that the drilling thereof upon the opposite sides will be coincident for forming a single aperture therethrough.

2. A device for drilling an aperture in a plate of glass comprising a drill block for supporting the glass while being partially drilled on one side thereof, means on said block for centering the glass thereon while one surface is being drilled, a head movably mounted therein provided with a tubular non-drilling engaging member of the same diameter and in alignment with the aperture to be drilled, and manually operated means for moving said tubular member in and out of engagement with the partially drilled portion when the glass is reversed for positioning the same while the other side is being drilled, the positioning of said glass being such that the drilling thereof upon the opposite sides will be coincident for forming a single aperture therethrough.

3. The combination with a drill for drilling an aperture in a plate of glass, of means for holding and positioning the glass to be drilled, comprising a drill block adapted to support said glass in position to be drilled on one side thereof, means on said block for centering the glass, a movable head contained in said block, a lever pivoted thereon and in engagement with said head for actuating the same toward the drill, and a tubular member mounted on said head in direct alignment with and having the same diameter as said drill adapted to be moved into engagement with the groove drilled in the glass for positioning the same for further drilling on the opposite side thereof.

In witness whereof, I have hereunto affixed my signature.

NEIL T. ALBRIGHT.